June 5, 1962
J. S. HAUG
3,037,758
CHECKERBRICK FOR USE IN GAS-MAKING APPARATUS
Filed May 17, 1960
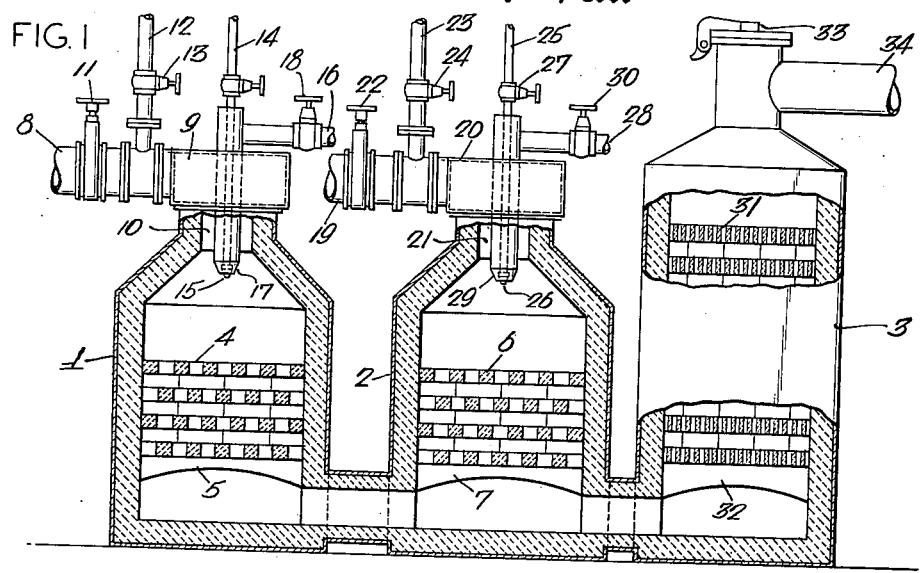
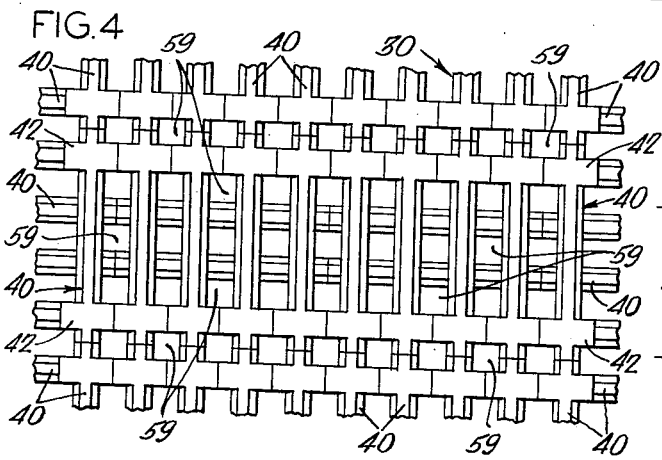
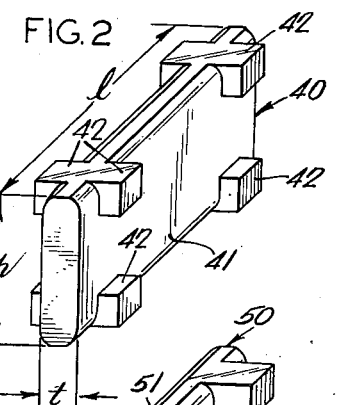
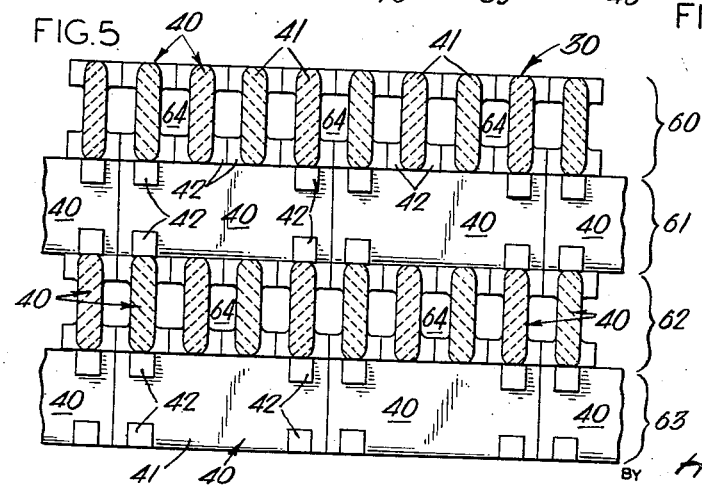
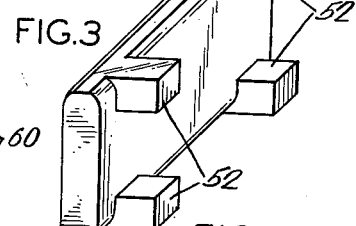
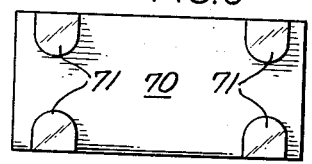
INVENTOR:
JOHN S. HAUG
BY Howson & Howson
ATTYS.

United States Patent Office 3,037,758
Patented June 5, 1962

3,037,758
CHECKERBRICK FOR USE IN GAS-
MAKING APPARATUS
John S. Haug, Philadelphia, Pa., assignor to United Engineers & Constructors Inc., Philadelphia, Pa., a corporation of Pennsylvania
Filed May 17, 1960, Ser. No. 29,757
13 Claims. (Cl. 263—51)

The present invention relates to the manufacture of high B.t.u. oil gas, having characteristics closely approximating those of natural gas, for use as a substitute for natural gas or for blending with natural gas to meet increased seasonal demands; and, more particularly, the present invention relates to novel oil gas-making apparatus and novel checkerbrick for use therein as well as to a novel method for making high B.t.u. oil gas utilizing said apparatus and checkerbrick.

The peak demand for gas usually occurs during only a relatively short period each year, and, therefore, the capital cost for producing this peak-load gas is of prime importance as this cost has ot be carried throughout the entire year. The present invention provides a means for a gas utility to meet this peak-load gas demand at minimum capital cost. The subject matter of the invention may be utilized with standard carburetted water-gas apparatus or with new apparatus of similar design by slight structural changes and additions.

In the past, standard carburetted water-gas apparatus has been modified for oil-gas manufacture utilizing the generator or carburetter or both as combustion-vaporizing shells and the superheater as a gas-fixing shell. Since the superheater already contained checkerwork little or no internal changes were felt necessary and the same type of checkerbrick and checkerwork utilized in the superheater as a carburetted water-gas set was utilized in the manufacture of oil gas.

It is the principal object of the present invention to provide novel oil-gas apparatus, checkerbrick for use therein and procedure for producing high B.t.u. oil gas by which substantially higher capacity is provided than has heretofore been obtainable.

It is another prime object to provide such substantially higher capacity in oil gas production but with minimum plant investment costs per unit of gas volume produced.

Another object is to provide means for producing a stable uniform high B.t.u. oil gas which can be handled in the existing carburetted water-gas treatment train while having the optimum paraffin content and minimum products of combustion content to provide maximum substitutability for natural gas.

Another object is to provide improved means for producing high B.t.u. oil gas whereby there is produced a tar of superior quality, including minimum free carbon content, minimum sulfonation residue, high valuable resin content, the ability to settle readily in the existing separator systems of gas-making utilities, and the ability to be easily dehydrated.

Still another object is to provide novel improved means for producing high B.t.u. oil gas whereby atmospheric pollution by smoke during the heating portion of the cycle is eliminated, and whereby the effluent from the gas-washing equipment is readily clarified and can be discharged into a storm sewer or stream without pollution.

A further object is to provide novel improved means for producing high B.t.u. oil gas whereby is eliminated oil carbon buildup on refractory surfaces within the equipment over prolonged periods of operation without wasteful use of excess air during the heating portion of the cycle.

The foregoing objects are realized in accordance with the present invention by the provision of novel oil gas-making apparatus, particularly a novel oil gas-fixing chamber containing checkerwork, novel checkerbrick for use in the checkerwork of said chamber and procedure involving the utilization of such checkerbrick, checkerwork and chamber.

The present invention involves the production of high B.t.u. oil-gas at a capacity considerably greater than conventional practice in a generating set, comprising at least one combustion-vaporizing chamber with means for admitting oil, steam and air thereinto in gas-flow communication with the bottom of an oil gas-fixing chamber and gas take-off means atop said gas-fixing chamber. Increasing the generating capacity requires a corresponding increase in the fixing surface in the oil gas-fixing chamber and at the same time requires a material reduction in the resistance to passage of the gas-making fluids, as compared with conventional constructions which resistance as is well known increases as the square of the flow rate. The fixing chamber according to the present invention contains a multiplicity of layers of spaced rows of checkerbrick in which each individual checkerbrick making up at least the bulk of the said checkerwork structure comprises a relatively thin elongated refractory block, with flat vertical faces. The use of thinner brick closely packed produces a greater area of fixing surface in a given volume of the gas-fixing chamber. The top and bottom edges of these blocks are convex in section so as to promote the smooth flow of gases and to increase the effective flow area at the meeting between the various courses. With conventional rectangular blocks the intersection of upper and lower courses block off the flow area to a great extent and produce a strangulation effect. This effect is also present in known so-called streamlined checkerbrick which have flat upper or lower surfaces, which not only reduce the flow area but create sharp corners which interrupt the smooth flow of the gases and create undesirable eddy currents. Previous known art in so-called streamlined checkers also comprises blocks with bulging sides, in contrast to the flat sides of the present invention, which while adding little to the streamlined effect, act to reduce the flow area unnecessarily and precent close spacing without great sacrifice of flow area. The blocks according to the present invention have on at least one broad face outwardly-extending lugs to provide accurate spacing between the blocks and to promote stability of the blocks in construction and operation of the checkerwork. The width of these lugs measured along the length of the block should be approximately equal to the thickness of the block.

The spacing lugs are so designed as to be flush with the top of said block and flush with the bottom of said block and provide flat horizontal bearing surfaces. Each course of blocks is substantially at right angles to the course below and the lugs are so arranged that the lugs of an upper course are directly in line with the blocks in the course below, and also in the course above, so that the lugs present no obstacle to the flow of gases. It is preferred to design these lugs so that there is an open space or interval half way up the block to permit horizontal flow of gases between flues and avoid the creation of independent chimneys wherein a local stoppage could render the whole vertical flue useless.

The checkerbrick in each layer are laid end-to-end across said gas-fixing chamber to form rows and side-by-side in alignment separated only by said outwardly-extending lugs; and the rows of checkerbrick in each layer lying at right angles to the rows of the next preceding layer with each bottom flat horizontal bearing surface lying along the top of a brick in the next preceding layer, and the rows of checkerbrick in alternate layers being in vertical alignment to provide straight vertical flues.

In one embodiment the checkerbrick making up the checkerwork structure will have only two pairs of lugs and these will extend from only one broad face of the brick. The lugs, in this case, will extend beyond the face of the brick a distance approximating one-half to one times the thickness of the brick. In another embodiment, two pairs of lugs will extend from each broad base of the brick; and, in this case, each lug will extend from its adjacent face a distance approximating one-fourth to one-half the thickness of the brick. In either embodiment the total extension beyond the brick provided by the lugs will approximate one-half to one times the thickness of the brick. In either embodiment the bottom of the upper lugs and the top of the lower lugs may provide a generally convex surface when viewed in cross-section.

The checkerbrick of the present invention has substantially less thickness than that of conventional checkerbrick which are generally 2½ inches thick. The distance between the flat vertical faces of the checkerbrick is also substantially less than the 2¾ inch spacing in conventional checkerwork. However, simple reduction in checkerbrick thickness and in spacing between checkerbrick, while providing greater surface per overall volume of checkerwork, would normally give rise to other problems, such as increased pressure drop, structural instability and difficulty in construction. The substantially reduced thickness of the present checkerbrick coupled with the substantially reduced spacing between the checkerbrick in the checkerwork, substantially convex upper and lower edges, and nature and position of the spacing lugs combine in a novel manner to permit substantially increased rates of flow through the checkerwork (substantially reduced time of contact), while retaining the requisite structural stability and ease of construction. In other words, the present invention provides a practical means for obtaining higher capacity in a high B.t.u. oil gas-making operation than has heretofore been available.

The manufacture of oil gas in accordance with the present invention involves cyclic operation; that is to say, during one portion of the cycle, fluid fuel is burned and the hot products of combustion are passed through the apparatus to store heat therein, and, during another part of the cycle, oil and steam are admitted to the apparatus where the oil is vaporized, pyrolyzed and converted into a stable gas utilizing the heat stored during the heating portion of the cycle. The heating- and gas-making steps are repeated sequentially over and over.

Hence, the method of the present invention comprises burning fluid fuel in a combustion-vaporizing zone and passing the resulting hot products of combustion from said zone upwardly through an oil-gas fixing zone to store heat therein; discontinuing said burning; injecting gas-making oil into said combustion-vaporizing zone vaporizing the oil therein and passing said vaporized oil, up through said heated gas-fixing zone and withdrawing the resulting gas; the hot products of combustion and the vaporized oil during their passage respectively upwardly through said gas-fixing zone, flowing through a multiplicity of straight vertical flues defined by layers of rows of relatively thin refractory flat-faced bricks laid end to end, the rows of each layer lying at right angles to the rows of the next succeeding layer and the rows of alternate layers being in vertical alignment; the spacing between each row of bricks in each layer being between about one-half and about one times the thickness of the brick and provided by vertical pairs of spacing lugs extending outwardly from at least one broad face of each brick, the vertical distance between the lugs in each pair providing horizontal gas-flow passages along each row, and the leading and trailing edges of each brick being generally convex and free from sharp corners and the rate of flow of said vaporized oil through said flues being controlled to provide a time of contact therein of less than one second.

The present invention will be more readily understood from a consideration of the drawings in which:

FIGURE 1 is a side elevational view, partly in section, of typical apparatus in which the present invention may be utilized;

FIGURE 2 is a perspective view of a preferred form of checkerbrick of the present invention;

FIGURE 3 is a perspective view of another form of checkerbrick of the present invention;

FIGURE 4 is a plan view of checkerwork structure prepared from the checkerbrick of FIGURE 2; and FIGURE 5 is a side elevational view of the checkerwork structure shown in FIGURE 4.

FIGURE 6 is a side elevational view showing a modification in the shape of the spacing lugs.

The improved gas-making conditions provided by the present invention include substantially reduced time of contact of the hydrocarbon vapors in the gas-fixing zone, uniform cracking conditions throughout the gas-making portion of the cycle, uniform cracking conditions over the cross section of the gas-fixing zone, substantially reduced pressure drop in the gas-fixing zone during the heating portion of the cycle and substantially increased heat-transfer efficiency in the gas-fixing zone.

The novel checkerbrick of the present invention and the novel checkerwork structure constructed therefrom provide gas passageways and flues through which the flow rate of the hydrocarbon vapor can be substantially greater in the gas-fixing zone as compared to conventional checkerbrick and checkerwork, with, at the same time, substantially increased surface exposed to the hydrocarbon vapors. This permits a substantially reduced time of contact of the hydrocarbon vapors in the gas-fixing zone. Because of the shorter contact time permitted and utilized, more uniform cracking conditions throughout the gas-making portion of the cycle are achieved and undesirable side reactions are avoided. The gas passage ways and flues provided by the novel checkerwork structure result in uniform cracking additions over the cross section of the gas-fixing zone.

The substantially convex leading and trailing edges of the checkerbrick (with respect to the flowing gases, including the hot combustion products) results in a substantially lower pressure drop from bottom to top of the checkerwork structure as compared to conventional checkerwork structure, and this permits greater flow rates. This feature together with the nature of the gas flow passages and flues provided by the novel checkerwork results in substantially increased heat-transfer efficiency during the heating portion of the cycle as well as during the gas-making portion of the cycle.

The net result of the foregoing is substantially higher gas-making capacity than has heretofore been obtainable coupled with minimum investment costs per unit of gas produced. In addition, the product gas itself possesses characteristics, including optimum high-paraffin and low-inerts content, heating value and specific gravity, making it readily substitutable for natural gas. Furthermore, the by-products produced possess superior characteristics representing an important improvement over conventional gas-making practice. The structure size and shape of the checkerbrick substantially reduces the eddy currents of the hydrocarbon vapors in the checkerwork structure. This feature facilitates the purging of the structure of hydrocarbon vapors and of products of combustion without excessive smoke. The aqueous effluent from the gas-washing equipment can be discharged directly to storm sewers and streams after simple known treatment without danger of pollution. The tar formed and collected has been found to contain a very low free carbon content and no significant sulfonation residue, while at the same time the tar has a high valuable resin content and the ability to settle readily in the separator systems already available in gas-making utilities and to be easily dehydrated. Moreover, it has been found that there is no carbon buildup on the refractory surfaces of the equipment which in the past has necessitated wasteful use of excess air for prevention or removal.

Referring to FIGURE 1, 1 is a refractory-lined steel shell, which may be the generator of a standard carburetted water gas set suitably modified as shown; 2 is a refractory-line steel shell, which may be the carburettor of a standard carburetted water gas set suitably modified as shown; and, 3 is a refractory-lined steel shell, which may be the superheater of a standard carburetted water gas set suitably modified as shown. Shells 1 and 2, in accordance with the present invention, serve as combustion-vaporizing chambers or zones and are substantially similar although they may differ somewhat in size and shape. It will be realized that only one combustion-vaporizing chamber need by employed. In combustion-vaporizing chamber 1 is located a checkerwork structure 4 supported as by refractory arch 5; and in combustion-vaporizing chamber 2 is checkerwork structure 6 supported as by refractory arch 7. The checkerwork structures 4 and 6, and the checkerbrick utilized in their construction, may be conventional. Air for combustion and any air purges is fed into chamber 1 through conduit 8, wind box 9 and annular chamber 10. The flow of air is controlled by suitable valve mechanism, e.g. 11. Steam for use during the oil-gas making portion of cycle any steam purges may be introduced to chamber 1 through conduit 12, leading into conduit 8, wind box 9 and annular chamber 10, the flow of steam being controlled by suitable valve mechanism, e.g. 13. Fluid fuel for combustion during the heating portion of the cycle may be introduced into chamber 1 through conduit 14 and nozzle 15, the flow of fuel being controlled by suitable valve mechanism. Oil for use during the gas-making portion of the cycle may be introduced to chamber 1 through conduit 16 and nozzle 17, the flow of the oil being controlled by suitable valve mechanism, e.g. 18. Similarly, air for use during the heating portion of the cycle and any air purges may be introduced to combustion-vaporizing chamber 2 through conduit 19, wind box 20, and annular chamber 21, the flow of air being controlled by suitable valve mechanism, e.g. 22. Steam for use during the gas-making portion of the cycle and any steam purges may be introduced to chamber 2 through conduit 23, wind box 20, and annular chamber 21, the flow of steam being controlled by suitable valve mechanism, e.g. 24. Fluid fuel for use during the heating portion of the cycle may be introduced to chamber 2 through conduit 25 and nozzle 26, the flow being controlled by suitable valve mechanism, e.g. 27. Oil for use during the gas-making portion of the cycle may be introduced to chamber 2 through conduit 28 and nozzle 29, the flow being controlled by suitable valve mechanism, e.g. 30.

Gas-fixing chamber 3 contains the novel checkerwork structure 31 of the present invention supported as by conventional refractory archwork 32. Combustion products formed during the heating portion of the cycle and passed through the apparatus are vented to the atmosphere through stack valve 33. Such gases may be passed through a waste heat boiler (not shown) before being vented to the atmosphere. The product oil gas formed during the gas-making portion of the cycle is led to a conventional gas recovery and collecting system, including a wash box (not shown), through conduit 34.

Referring to checkerwork structure 31, this is made up of a multiplicity of layers of spaced rows of checkerbrick in which each individual checkerbrick making up at least the bulk of the checkerwork structure will have a structure of the type described hereinabove. Two such checkerbrick are illustrated in FIGURES 2 and 3. As shown in FIGURE 2, the checkerbrick 40 comprises an elongated relatively thin block-like section 41 having flat vertical faces and having a thickness $t$ of about ⅝ to 1½ inches, a height $h$ from about 2 to about 12 inches and a length $l$ from about 9 to about 36 inches. Preferred dimensions for the checkerbrick are a thickness $t$ of about 1¼ inches, a height $h$ of about 4–5 inches and a length $l$ of about 9–10 inches. Block 41 has on each broad face thereof two vertical pairs of outwardly-extending lugs 42 generally similar in shape and dimensions. The lugs 42 provide a total extension beyond the thickness of the block of from about one-half to one times the thickness of the block 41. In a brick having the preferred dimensions referred to above each lug extends about ⁵⁄₁₆–⅝ inch beyond the face of block 41. One lug of each vertical pair is adjacent the top of block 41 so that its top together with the top of the corresponding lug on the opposite face of the block presents a flat horizontal bearing surface, and the other lug of each pair is adjacent the bottom of block 41 so that its bottom together with the bottom of the corresponding lug on the opposite face of the block presents a flat horizontal bearing surface. One vertical pair of lugs on each face is near but spaced from one end of the block and the other vertical pair of lugs on each face is near but spaced from the other end of the block. The spacing of the lugs from the nearest end of block 41 is preferably approximately half the extension provided by the lugs beyond the thickness of block 41 so that the lower flat horizontal bearing surface provided thereby rests on the top of the brick next below as shown in FIGURE 5. This means that, in a brick having the preferred dimensions referred to above, the distance between a lug 42 and the nearest end of block 41 will be approximately ⅝ inch. The outer face of each lug presents a flat surface parallel with the broad face from which the lug extends. The vertical distance between the lugs in each pair should be at least as great as one half the thickness of the block so that there is ample opportunity for circulation of gases between the lugs of each pair when the bricks are laid end-to-end and side-by-side. In a brick having the preferred dimension referred to above this distance is approximately 2 inches. The top and bottom edges of the block on both sides of the lugs, i.e. between the lugs and between the lugs and the ends of the block, present a generally convex surface when viewed in cross section. This means that the edges can be rounded, as shown in FIGURE 2, or that the entire edge may be curved.

In FIGURE 3 is illustrated another embodiment of the present checkerbrick which provides, in the checkerwork constructed therefrom, a structure generally similar to that provided in checkerwork constructed from the brick of FIGURE 2. The dimensions and shape of block 51 are as described in connection with block 41 of FIGURE 2. The only material difference between brick 50 of FIGURE 3 and brick 40 of FIGURE 2 is that, in brick 50 there are two vertical pairs of lugs 52 generally similar in shape and dimensions on only one face of block 51, and lugs 52 extend twice the distance from the broad face as do lugs 42. Thus the length of each lug 52 will be approximately one-half to one times the thickness of block 51. This means that, in a brick having the preferred dimensions referred to above each lug 52 will have a length of about ⅝ to about 1¼ inches.

The bricks themselves will be made of conventional refractory, heat-resisting inorganic material, such as ordinary fire clay, and other silica, alumina, and silicon carbide compounds and mixtures.

In FIGURE 4 is illustrated in detail the construction of checkerwork 31 for use in the gas-fixing chamber 3, using, for the purpose of illustration, bricks 40 of FIGURE 2. As shown in FIGURE 4, the bricks are laid in individual layers made up of individual rows made up of individual bricks 40. In each row, the checkerbricks are laid end-to-end across the inside of the gas-fixing shell 3 from wall-to-wall. Another row is similarly laid along side the first row so that the vertical faces of lugs 42 on the adjacent bricks are in abutment. Hence, in each layer the bricks are in end-to-end and side-by-side alignment, the broad flat faces being separated only by the outwardly-extending lugs 42. FIGURE 4 illustrates this construction when viewed from above. Each bottom flat bearing surface formed by the bottom lugs rests directly on the top of a checkerbrick in the layer next below, and each top flat bearing surface formed by the top lugs forms a flat base on which rests a checkerbrick in the layer next above. In the spaces between the checkerbrick 40 can be seen the row of checkerbrick next below in which the rows of brick lie at right angles. FIGURE 5 also illustrates in vertical section the side-by-side alignment of bricks 40 separated only by lugs 42. As also seen in FIGURE 5, the rows of checkerbrick in each layer lie at right angles to the rows of the next succeeding layer, that is the rows of checkerbrick in layer 60 lie at right angles to the rows of checkerbrick in layer 61, the rows of checkerbrick in layer 61 lie at right angles to the rows of checkerbrick in layer 62, and so on. The rows of checkerbrick in alternate layers are in vertical alignment; that is to say, each brick in layer 60 is directly above a brick in layer 62, and each brick in layer 61 is directly above a brick in layer 63, and so on. The lengths of checkerbrick in one layer are also in vertical alignment with the lugs in the checkerbrick in the layers next above and next below. All this provides straight vertical flues 59 throughout the checkerwork structure. Moreover, because of the nature of lugs 42, the spaces between them and the spacing between them and the ends of the brick, there are provided horizontal gas flow passages 64 which provide gas-flow communication between all the flues. This prevents difficulty should one or more vertical flue spaces 59 become clogged, and permits equalization of conditions throughout the cross section of the checkerwork structure.

The first or bottom layer of checkerbrick 40 is laid on conventional refractory arches 32, the rows of checkerbrick in that layer being at right angles to the arches.

The brick 50 of FIGURE 3 can be employed to make the checkerwork structure 31 and this will provide the same appearance as well as flue and gas passage arrangement as shown in FIGURES 4 and 5, the only difference being that, instead of two lugs abutting half way between the broad faces of the bricks, the longer lugs will abut the broad flat face of the adjacent brick.

FIGURE 6 illustrates a modification of the checkerbricks shown in FIGURES 2 and 3 in which the upper edges of each bottom lug 72 of the brick 70 are rounded to present a generally convex surface when viewed from the side (a generally inverted U shape) and in which the lower edges of each top lug 71 are rounded to present a generally convex surface when viewed from the side (a generally U shape).

As stated, the procedure for making oil gas to which the present invention is applicable, is cyclic, involving a heating stage, sometimes referred to as the "blast" or "blow", and a gas-making stage, sometimes referred to as the "gas-making run" or "run." During the heating portion of the cycle, air is admitted to combustion-vaporizing chambers 1 and 2 through conduits 8 and 19, respectively. At the same time, fluid fuel is admitted through conduits 14 and 25, respectively, the oil being forced out burner nozzles 15 and 26, respectively, combustion taking place principally in the open space in the upper part of chambers 1 and 2. The burning fuel and hot combustion products pass downwardly in parallel through checkerwork 4 and 6, respectively, and thence in series into gas-fixing chamber 3 flowing upwardly through checkerwork 31 and outwardly through stack valve 33.

When the desired heat has been stored in the checkerwork structures of chambers 1, 2 and 3, as determined by measurement of temperatures well known to those familiar with gas-making art, combustion is discontinued. The gas-making run is commenced by admitting gas-making oil through conduits 16 and 28, respectively. If desired steam may be admitted concurrently through conduits 12 and 23, respectively. The oil vaporizes and becomes partially pyrolyzed (cracked into lighter hydrocarbons) in the checkerwork in chambers 1 and 2. During the gas-making stage the flow is downwardly in parallel through chambers 1 and 2. The vaporized and partially cracked oil vapors and steam then pass in series into the bottom of chamber 3 and upwardly through the checkerwork structure 31 where the hydrocarbon vapors become fixed into a stable gas. The resulting gas is then conducted through conduit 34 to conventional gas recovery equipment.

The foregoing description of the process has dealt with the principal steps of the cycle, and it will be understood by those familiar with the gas-making art that suitable purges may be made between the principal steps to clear the system of undesirable gases, to insure greater recovery of the desired product gases and to prevent accumulation of explosive mixtures in the system. For example, between the heating stage and gas-making stage, there is advantageously a brief purging period to force residual combustion products out the stack. This may be accomplished by admitting air through conduits 8 and 19 and then by admitting steam through conduits 12 and 23 before closing stack valve 33. Between the gas-making stage and the heating stage, there is also advantageously another purging period for forcing product oil gas remaining in the set to the gas-recovery equipment; and this may be accomplished by continuing the flow of steam through conduits 12 and 23 after the gas-making oil has been turned off, and then admitting air through conduits 8 and 19, before stack valve 33 is opened. In addition, it may be desirable to add a small amount of products of combustion to the product oil gas to adjust its characteristics, and this may be accomplished by delaying opening of stack valve 33 at the beginning of the heating stage.

Referring to the fuel employed during the heating step, it may be any fluid fuel such as those ordinarily employed in the gas-making industry, for instance petroleum oil, tar, combustible gas, and the like. Preferably the fuel employed will be a petroleum oil and a wide variety of such oils is available for this use, ranging from relatively light distillates, through Numbers 2 and 3 furnace oils, to heavy residual oils, and the like.

A wide range of gas-making oils may also be employed, and these may range from light hydrocarbon oils, such as propane, butane and kerosene, through medium oils, like gas oil and diesel oil, to the heavy residual oils, like bunker C oil.

The present invention has been operated in a commercial size oil-gas set having two combustion-vaporizing chambers as shown in FIGURE 1 and a gas-fixing chamber, as shown in FIGURE 1, having an inside diameter of 8 feet 6 inches. The checkerwork in the gas-fixing chamber was 11.25 feet in height, and each brick was 1¼ inch in width, 4½ inches high and 9¾ inches long with two pairs of lugs ⅝ inch long extending from each broad face of the brick to provide a spacing between the bricks of 1¼ inches. The lugs, approximately 1¼" x 1¼" square, were spaced about ⅝ inch from the ends of the brick. The results and operation were compared with those of a conventional high B.t.u. oil gas set in which the gas-fixing chamber also had an inner diameter of 8 feet 6 inches and a checkerwork structure 24 feet in height in which each brick was 2½ inches wide, 4½ inches high and 9 inches long, and with the bricks spaced 2¾ inches apart. In each case the fuel employed during the heating portion of the cycle was equivalent to a number 1 fuel oil, and the oil employed during the gas-making portion of the cycle was kerosene. With the set of the present invention, the cycle lasted 2.3 minutes divided up in the following manner and sequence: heating period in which the products of combustion are vented to the atmosphere—50%; air purge in which the gases are vented to the atmosphere—3%; steam purge in which the gases are vented to the atmosphere—2%; gas-making period—34%; steam purge forcing product gas to the gas recovery equipment—8%; air purge to assist in purging the residual gases to the gas recovery equipment—2%; and closed blow in which combustion is carried on and the combustion products further assist in purging the apparatus—1%. With the set of the present invention oil gas, having a heating value of 1144 B.t.u., was made at the rate of 6,140 M c.f. per day. During the heating portion of the cycle and closed blow, heating oil was admitted to the combustion-vaporizing chambers at the rate of 2.06 gallons (total) per M c.f. of oil gas produced; during the gas-making portion of the cycle kerosene was admitted to each combustion-vaporizing chamber at a rate of 77 g.p.m., equivalent to 77 g.p.m. per thousand cu. ft. of gross internal volume of a vaporizing chamber, or at a total rate of 12.28 gallons per M c.f. of product gas; process steam was admitted at the rate of 6.7 pounds per M c.f. of product gas; and purging steam was admitted at the rate of 8.1 pounds per M c.f. of product gas. It has been found advantageous to admit process oil at a rate corresponding to at least 70 g.p.m. per thousand cu. ft. of gross internal volume of a vaporizing chamber.

Pertinent comparative data between the apparatus and the process of the present invention and that of the convenional oil-gas apparatus and procedure are set forth in the following table:

Table

| Item | | Conv. | Present Invention |
|---|---|---|---|
| A | Gas produced (therms/day) | 70,000 | 70,000 |
| B | Time of contact of gases in checkerwork of gas-fixing chamber (seconds) | 1.60 | 0.52 |
| C | Air rate during heating period (c.f.m.) | 32,000 | 27,500 |
| D | Air pressure drop through checkerwork of gas-fixing chamber during heating period (inches H₂O) | 31.3 | 16.5 |
| E | Internal volume of three lined shells (cu. ft.) | 3,375 | 2,655 |
| F | Relative gas made for same volume based on 2655 cu. ft. volume (therms/day) | 55,000 | 70,000 |
| G | Checkerbrick surface in gas-fixing chamber (sq. ft.) | 8,100 | 7,100 |
| H | Height of checkerwork in gas-fixing chamber (ft.) | 24.00 | 11.25 |
| I | Equivalent checkerbrick surface for same volume of checkerwork (sq. ft.) | 3,800 | 7,000 |
| J | Average cyclic temp. at top of checkerwork in gas-fixing chamber (° F.) | 1,545 | 1,560 |
| K | Cyclic temp. swing at top of checkerwork in gas-fixing chamber (° F.) | 50 | 0 |
| L | Length of cycle (min.) | 3.0 | 2.3 |
| M | Width of individual checkerbrick (in.) | 2.50 | 1.25 |
| N | Width of space between checkerbrick in checkerwork (in.) | 2.75 | 1.25 |
| O | Percent of void volume in checkerwork based on gross checkerwork volume | 66 | 43 |
| P | Heating value at product gas (B.t.u.) | 1,117 | 1,145 |
| Q | Specific gravity of product gas | 0.82 | 0.75 |
| R | Paraffins in product gas (%) | 40 | 45 |
| S | Inerts in product gas (percent N₂+ percent CO₂) | 10 | 5 |
| T | Free carbon in product tar (percent) | 9.0 | 4.8 |
| U | Sulfonation residue of product tar (percent) | nil | nil |

Modification is possible in structural details and operating conditions without departing from the scope of the claims.

I claim:

1. A checkerbrick for use in the checkerwork structure of a gas-fixing chamber of a high B.t.u. oil-gas generating set comprising a relatively thin refractory block having on at least one broad face thereof two vertical pairs of outwardly-extending lugs generally similar in shape and dimensions, the extension provided by the lugs beyond the thickness of said block being on the order of one-half to one times the thickness of said block, one pair of lugs being near to but spaced from one end of said block and the other pair of lugs being near to but spaced from the other end of said block, one lug of each pair also being substantially flush with the top of said block and its top representing a flat horizontal bearing surface, the other lug of each pair being substantially flush with the bottom of said block and its bottom representing a flat horizontal bottom bearing surface, the vertical space between the lugs in each pair being at least as great as one-half the thickness of said block, and the top and bottom edges of said block on each side of said lugs representing a generally convex surface when viewed in cross section.

2. A refractory brick for use in the checkerwork structure of a gas-fixing chamber of a high B.t.u. oil-gas generating set comprising a relatively thin refractory block having on a single broad face thereof two vertical pairs of outwardly-extending lugs generally similar in shape and dimensions, the extension provided by the lugs beyond the face of said block being on the order of one-half to one times the thickness of said block, one pair of lugs being near to but spaced from one end of said block and the other pair of lugs being near to but spaced from the other end of said block, one lug of each pair also being substantially flush with the top of said block and its top representing a flat horizontal bearing surface, the other lug of each pair being substantially flush with the bottom of said block and its bottom representing a flat horizontal bottom bearing surface, the vertical space between the lugs in each pair being at least as great as one-half the thickness of said block, and the top and bottom edges of said block on each side of said lugs representing a generally convex surface when viewed in cross section.

3. A refractory brick for use in the checkerwork structure of a gas-fixing chamber of a high B.t.u. oil-gas generating set comprising a relatively thin refractory block having on each broad face thereof two vertical pairs of outwardly-extending lugs generally similar in shape and dimensions, the extension provided by said lugs beyond the thickness of said block being on the order of one-half to one times the thickness of said block, one pair of lugs on each face being near to but spaced from one end of said block and the other pair of lugs on each face being near to but spaced from the other end of said block, one lug of each pair also being substantially flush with the top of said block and its top together with the top of the corresponding lug on the opposite face of the block representing a flat horizontal bearing surface, the other lug of each pair being substantially flush with the bottom of said block and its bottom together with the bottom of the corresponding lug on the opposite face of the block representing a flat horizontal bottom bearing surface, the vertical space between the lugs in each pair being at least as great as one-half the thickness of said block; and the top and bottom edges of said block on each side of said lugs representing a generally convex surface when viewed in cross section.

4. The brick of claim 1 wherein said lugs are spaced from the nearest end of said block a distance about the same as half the extension provided by the lugs beyond the thickness of said block.

5. The brick of claim 2 wherein said lugs are spaced from the nearest end of said block a distance about the same as half the extension provided by the lugs beyond the thickness of said block.

6. The brick of claim 3 wherein said lugs are spaced from the nearest end of said block a distance about the same as half the extension provided by the lugs beyond the thickness of said block.

7. The checkerbrick of claim 1 wherein the bottom edges of the top lugs and the upper edges of the bottom lugs represent a generally convex surface when viewed in cross-section.

8. A refractory brick for use in the checkerwork structure of a gas-fixing chamber of a high B.t.u. oil-gas generating set comprising a refractory block having a thickness of about 1¼ inches, a height of about 4–5 inches and a length of about 9–10 inches, said block having on at least one broad face thereof two vertical pairs of outwardly-extending lugs generally similar in shape and dimensions, the extension provided by the lugs beyond the thickness of said block being on the order of one-half to one times the thickness of said block, one pair of lugs being near to but spaced from one end of said block and the other pair of lugs being near to but spaced from the other end of said block, one lug of each pair also being substantially flush with the top of said block and its top representing a flat horizontal bearing surface, the other lug of each pair being substantially flush with the bottom of said block and its bottom representing a flat horizontal bearing surface, the vertical space between the lugs in each pair being at least as great as one-half the thickness of said block, and the top and bottom edges of said block on each side of said lugs representing a generally convex surface when viewed in cross section.

9. The brick of claim 8 wherein said lugs are spaced from the nearest end of said block a distance of about 5/8 inch.

10. The brick of claim 8 wherein the vertical space between the lugs in each pair is about 2 inches.

11. A refractory brick for use in the checkerwork structure of a gas-fixing chamber of a high B.t.u. oil-gas generating set comprising a refractory block having a thickness of about 1¼ inches, a height of about 4–5 inches and a length of about 9–10 inches; said block having on one broad face thereof two vertical pairs of outwardly-extending lugs generally similar in shape and dimensions and extending about 5/8 to about 1¼ inches beyond the broad face of the block, one pair of lugs being near to but spaced from one end of said block and the other pair of lugs being near to but spaced from the other end of said block, one lug of each pair also being substantially flush with the top of said block and its top representing a flat horizontal bearing surface, the other lug of each pair being substantially flush with the bottom of said block and its bottom representing a flat horizontal bearing surface, the vertical space between the lugs in each pair being at least as great as one-half the thickness of said block, and the top and bottom edges of said block on each side of said lugs representing a generally convex surface when viewed in cross section.

12. A refractory brick for use in the checkerwork structure of a gas-fixing chamber of a high B.t.u. oil-gas generating set comprising a refractory block having a width of about 1¼ inches, a height of about 4–5 inches and a length of about 9–10 inches; said block having on each broad face thereof two pairs of outwardly-extending lugs generally similar in shape and dimensions and extending beyond its respective face a distance of about 5/16 to about 5/8 inch, one pair of lugs on each face being near to but spaced from one end of said block and the other pair of lugs on each face being near to but spaced from the other end of said block, one lug of each pair also being substantially flush with the top of said block and its top together with the top of the corresponding lug on the opposite face of the block representing a flat horizontal bearing surface, the other lug of each pair being substantially flush with the bottom of said block and its bottom together with the bottom of the corresponding lug on the opposite face of the block representing a flat horizontal bearing surface, the space between the lugs in each pair being at least as great as one-half the thickness of said block, and the top and bottom edges of said block on each side of said lugs representing a generally convex surface when viewed in cross section.

13. The checkerbrick of claim 12 wherein said lugs are spaced from the nearest end of said block a distance of about 5/16 to about 5/8 inch; and wherein the vertical space between the lugs in each pair is about 2 inches.

References Cited in the file of this patent

UNITED STATES PATENTS

| 982,754 | Waring | Jan. 24, 1911 |
| 2,205,554 | Brandegee et al. | June 25, 1940 |

FOREIGN PATENTS

| 224,368 | Great Britain | Nov. 13, 1924 |
| 372,632 | Great Britain | May 12, 1932 |
| 84,665 | Sweden | Oct. 22, 1935 |